United States Patent [19]
Iwasaki et al.

[11] Patent Number: 5,863,572
[45] Date of Patent: Jan. 26, 1999

[54] METHOD OF USING LIQUID FEED FOR CHICKEN CONTAINING GLUCOSE

[75] Inventors: Kazuya Iwasaki; Yoshinori Takahashi; Sonosuke Adachi, all of Kuroiso, Japan

[73] Assignee: Itochu Feed Mills Co., Ltd., Tokyo, Japan

[21] Appl. No.: 846,227

[22] Filed: Apr. 28, 1997

[51] Int. Cl.$^6$ .................................................. A23K 1/18
[52] U.S. Cl. ................................................. 426/2; 426/807
[58] Field of Search ......................................... 426/2, 807

[56] References Cited

U.S. PATENT DOCUMENTS

| | | | |
|---|---|---|---|
| Re. 35,699 | 12/1997 | Lange et al. | 426/2 |
| 4,961,952 | 10/1990 | O'Sullivan | 426/615 |
| 5,578,584 | 11/1996 | Katta et al. | 514/54 |

FOREIGN PATENT DOCUMENTS

| | | |
|---|---|---|
| 1601716 | 10/1961 | France . |
| 3327361 | 5/1984 | Germany . |
| 2090192 | 9/1997 | Russian Federation . |
| 1291140 | 2/1987 | U.S.S.R. . |
| 1635997 | 3/1991 | U.S.S.R. . |

OTHER PUBLICATIONS

Ermakova, Tr. Vses. Nauchno–Issled. Tekhnol. Inst. Ptit-sevod., vol. 38, pp. 106–110, 1974.
Krasuchi et al., Zesz. Probl. Postepor. Nauk. Roln. vol. 297, pp. 269–277, 1986.
Wang, Yaoxue Tongbao, vol. 20 (1), pp. 26–27, 1985.
Ostrowski–Meissner, Comp. Biochem. Physiol., vol. 70A, No. 1, pp. 1–8, 1981.

*Primary Examiner*—Chhaya D. Sayala
*Attorney, Agent, or Firm*—Burns, Doane, Swecker & Mathis, LLP

[57] ABSTRACT

A liquid feed containing 1~10% by weight of monosaccharide alone or in combination with 0.1~1.0% by weight of sodium bicarbonate is fed to broiler chicks, layers or breeders in the summer season, thereby preventing reduction of body weight increase rate in broiler chicks as well as reduction of egg production yield in layers or breeders, and further preventing the mortality of broiler chicks, layers or breeders caused by heatstroke. In addition a liquid feed containing 1~10% by weight of monosaccharide alone or in combination with 0.1~1.0% by weight of sodium bicarbonate is fed to layers in a later stage at an ordinary temperature or at lower temperature thereby preventing production of extra large eggs which does not meet standard requirements.

4 Claims, No Drawings

METHOD OF USING LIQUID FEED FOR CHICKEN CONTAINING GLUCOSE

The present invention relates to a liquid feed for chicken which prevents reduction of body weight increase rate caused by hot stress in broiler chicks and prevents mortality (death) caused by heatstroke and prevents reduction of egg production yield caused by hot stress in layers and breeders and mortality (death) caused by heatstroke, to its feeding method and to an additive for preparing the liquid feed.

Also, the present invention relates to a liquid feed for chicken which prevents production of extra large eggs in layers and breeders at a later stage, to its feeding method and to an additive for preparing the liquid feed.

PRIOR ART

In general, in the summer season chickens are apt to suffer from hot stress and consequently various bad influences affect them. For example, in broiler chicks the increase rate of body weight (rate of body weight increased for a given period) is reduced by 5~50% and some ones die due to heatstroke. Also, in layers and breeders egg production yield (a value calculated by dividing number of eggs layed for a given period by the total number of chickens per day; % Hen Day) is reduced by 5~10% and some die due to heatstroke like broiler chicks.

As means to cope with hot stress and heatstroke in the summer season, attempts have been made to ventilate in the chicken house, to keep it in the shade, to generate fog-like fine water drops in it (by sprinkler), to add sodium bicarbonate to drinking water and feed and so on.

Also, layers which are in a later stage (about 400 days old or older) tend to lay eggs of larger size or over-weight size than the ordinary table egg sizes (MS size: 52~58 g, M size: 58~64 g, L size: 64~70 g) which are put on the marketplace. The eggs of over-weight size which do not meet the Japanese standard requirements causes economical loss in chicken egg industry because their main utilization is limited to inexpensive liquid egg. The causes which layers in a later stage might lay eggs of over-weight size has not been identified yet. According to the present inventors' study, however, it is considered to be one of the causes that as layers grow older, the feed intake increases when fed at an ordinary temperature or at low temperature in a later stage.

As the means to inhibit the increase of egg weight in a later stage, certain restrictions have been made as to the feed amount and specific nutrients (methionine, linoleic acid). However, any of these prior art means was insufficient for preventing reduction of the body weight increase rate and of egg production yield and for preventing mortality caused by heatstroke and almost no appreciable effect can be achieved in the case that the temperature rises suddenly. Also, in the prior art means taken to inhibit the increase of egg weight in a later stage, the egg production yield decreases and so the productivity becomes low.

SUMMARY OF THE INVENTION

An object of the present invention is to solve the problems caused by the summer heat.

That is, an object of the present invention is to prevent not only lowering of body weight increase rate caused by hot stress in broiler chicks but also their mortality by heatstroke.

Another object of the present invention is to prevent not only lowering of egg production yield caused by hot stress in layers and breeders but also their mortality by heatstroke.

A further object of the present invention is to prevent production of eggs with over-weight size or extra large eggs by layers in a later stage at the ordinary temperature or lower without lowering egg production yield. In other words, one object of the present invention is to raise productivity of eggs of which meet standard requirements for the table eggs.

The present invention relates to a liquid feed for chicken which contains 1~10% by weight of monosaccharide alone or in combination with 0.1~1.0% by weight of sodium bicarbonate. When the liquid feed is fed to broiler chicks, layers or breeders in the summer season, it has the effect of preventing reduction in the increase rate of body weight caused by hot stress in broiler chicks, prevents reduction of egg production yield caused by hot stress in layers and breeders and prevents the mortality of broiler chicks, layers and breedings by heatstroke. Also, when it is fed to layers in a later stage at the ordinary temperature or at lower temperature, it has the effect of preventing the production of extra large eggs without lowering egg production yield.

DETAILED EXPLANATION OF THE INVENTION

The present inventors have investigated in order to achieve the above objects, and found that the concentration of glucose in blood rises markedly due to various stresses and that a large intake of glucose is effective not only to mitigate hot stress but also to prevent the mortality caused by heatstroke. And, the present inventors have investigated about means to enhance glucose intake, and found that in the summer season, feed intake decreases while water intake increases. The present invention is based on these findings.

That is, the liquid feed for chicken in the present invention is characterized by containing 1~10% preferably 3~5% by weight of monosaccharide. If the amount of monosaccharide is less than 1%, the preventive effect against lowerings of body weight increase rate and of egg production yield and the preventive effect against the mortality caused by heatstroke are not sufficient. When it exceeds 10%, the viscosity of the liquid feed becomes so high that water intake becomes less. Examples of monosaccharide include glucose, fructose and galactose.

In addition to monosaccharide, sodium bicarbonate may be incorporated in the liquid feed for chicken thereby there may be exerted significantly the preventive effect against reduction of body weight increase rate and of egg production yield as well as the preventive effect against mortality caused by heatstroke. The amount incorporated of sodium bicarbonate may be 0.1~1.0% preferably 0.3~0.5% by weight. When it is less than 0.1%, the effects as above-stated cannot be attained significantly. When it exceeds 1.0%, sodium bicarbonate does not dissolve completely in water and clogging of water feeding apparatus and of pipes occurs and further deterioration in egg quality and inhibition of the body weight increase rate occur.

Sodium bicarbonate has been often fed to a broiler chick for the purpose of recovering metabolic alkalosis which occurs due to excessive heat-radiating action through its opening breathing. And hence, recovery effect of the metabolic alkalosis may be simultaneously attained. This may be similarly applied to layers.

Other additives than two components of monosaccharide and sodium bicarbonate may be incorporated in the liquid feed, and include vitamins, minerals, amino acids, perfumes, acidifying agents, emulsifiers, stabilizers and the like.

The first embodiment in feeding chicken with the liquid feed of the present invention is characterized by a method wherein liquid feed containing 1~10% by weight of monosaccharide is fed to chicken in the summer season. In the summer season where high temperature is kept successively, a chicken is apt to suffer from hot stress and feed intake becomes little. If expressed in temperature, it is about 28° C. or higher. Hot stress may be varied depending on the environment (ventilation, humidity etc.) surrounding the chicken house and space per chicken, and so the feeding amount is determined through the observation of the hot stress status. Also, the liquid feed of the present invention may be fed to chicken before the summer season. The concentration of monosaccharide in the liquid feed may be kept as low as 1~1.5% before the summer season while it may be kept as high as 2~5% in the summer season.

As to the feeding method, it may be conducted continuously or at intervals.

It has been found that when liquid feed containing monosaccharide is fed to layers in a later stage, the increase of egg weight may be prevented without causing reduction of egg production yield.

The second embodiment in feeding chickens with the liquid feed of the present invention is characterized by a method wherein liquid feed containing 1~10% by weight of monosaccharide is fed to layers in a later stage at an ordinary temperature or at low temperature. The terms "a later stage" is meant "about 400 days old or older after hatching". Also, the terms "an ordinary temperature or at low temperature" is meant "at about 25° C. or lower" and hence it excludes such time as feed intake decreases due to elevated temperature. As above-stated, the amount of the liquid feed is suitably adjusted according to the observation of the hot stress status.

As to the feeding method, it may be conducted continuously or at intervals.

The liquid feed prepared in advance in a factory may be directly fed to chickens. Otherwise, monosaccharide and sodium bicarbonate are blended in the prescribed proportions to prepare an additive for the liquid feed, and the additive may be dissolved in water when employed in the chicken house.

The liquid feed of the present invention may also be used for pig, cattle and horse.

The liquid feed of the present invention has advantages over the conventional solid feed in the amount to be fed to chickens at an elevated temperature in the summer season. That is, there is no tendency to decrease the feed amount as seen in the solid feed. The feed intake in the elevated temperature becomes rather greater than the ordinary temperature and it is rapidly absorbed in the body tissue in comparison with the solid feed. Therefore, hot stress is effectively mitigated thereby not only reduction of body weight increase rate and of mortality by heatstroke in broiler chicks may be prevented but also reduction of egg production yield and of mortality by heatstroke in layers and breeders may be prevented.

Also, in the present invention monosaccharide is absorbed in the layers' body in a large amount thereby growth of extra large eggs may be inhibited with the maintenance of good egg production yield.

EXAMPLES

[Conventional Example 1, Comparative Example 1 and Examples 1 and 2]

Liquid feed for broiler chicks:

There were prepared liquid feed compositions shown in Table 1.

TABLE 1

|  | Conventional Example 1 | Comparative Example 1 | Example 1 | Example 2 |
| --- | --- | --- | --- | --- |
| Glucose | 0 | 0 | 5 | 5 |
| Sucrose | 0 | 5 | 0 | 0 |
| Sodium Bicarbonate | 0 | 0 | 0 | 0.5 |
| Water | 100 | 95 | 95 | 94.5 |
| Total (%) | 100 | 100 | 100 | 100 |

Feeding method:

Each of the liquid feeds shown in Table 1 was fed to broiler chicks continuously and a commercial feed ("Bro-Ace G" a product of Ishinomaki Plant, Itochu Feed Mills Co., Ltd. 18% of crude protein content and 3230 kcal of metabolic calorie) was fed ad libitum through the feeding period.

Testing method:

Eighty male broiler chicks of 31 days old were divided into 4 groups of Conventional Example 1, Comparative Example 1 and Examples 1 and 2, each consisted of 20 broiler chicks. Each group was fed in a environment control room for the period of from 31 days old to 41 days old at room temperature of 26°~28° C. and the room temperature was raised to 42° C. over 5 hours at 42 days old.

The body weight increased through the test period of up to 41 days old and the mortality caused due to high temperature at 42 days old were compared.

Test results:

The results are shown in Table 2.

TABLE 2

|  | Conventional Example 1 | Comparative Example 1 | Example 1 | Example 2 |
| --- | --- | --- | --- | --- |
| Body Weight Gain through the Test Period (g) | 788 | 771 | 796 | 818 |
| Mortality (%) | 95 | 85 | 35 | 0 |

It was confirmed from the results shown in Table 2 that the mortality in Examples 1 and 2 are significantly low in comparison with that in Conventional Example 1 and Comparative Example 1.

[Conventional Examples 2 and 3 and Examples 3 and 4]

Liquid feed for broiler chicks:

There were prepared liquid feed compositions shown in Table 3.

TABLE 1

|  | Conventional Example 2 | Conventional Example 3 | Example 3 | Example 4 |
| --- | --- | --- | --- | --- |
| Glucose | 0 | 0 | 4 | 4 |
| Water | 100 | 100 | 96 | 96 |
| Total (%) | 100 | 100 | 100 | 100 |

Feeding method:

Each of the liquid feeds shown in Table 3 was fed to broiler chicks continuously and a commercial feed ("Bro-Ace G", a product of Ishinomaki Plant, Itochu Feed Mills Co., Ltd. 18% of crude protein content and 3230 kcal of metabolic calorie) was fed ad libitum through the feeding period.

Testing method:

One thousand and two hundred male and female broiler chicks of 35 days old were divided into 4 groups of Conventional Example 2, Conventional Example 3 and Examples 3 and 4, each consisted of 300 broiler chicks. Each group was fed in a test chicken house in Technical Research and Development Department, Itochu Feed Mills Co., Ltd. at Kuroiso-shi, Tochigi, Japan for the period of from Sep. 9, 1994 to Oct. 4, 1994 (60 days old). A typhoon occurred on Sep. 29, 1994 (55 days old) in the middle of the test and the temperature in the chicken house rose rapidly to 28° C. from 23° C. and caused sudden increase in the mortality due to heatstroke.

The body weight increased through the test period and the mortality were compared.

Test results:

The results are shown in Table 4.

TABLE 4

|  | Conventional Example 2 Male | Conventional Example 3 Female | Example 3 Male | Example 4 Female |
|---|---|---|---|---|
| No. of Chickens at the Start of the Test | 310 | 314 | 303 | 315 |
| No. of Chickens at the End of the Test | 188 | 248 | 258 | 284 |
| Mortality (%) | 39.4 | 21.0 | 14.9 | 9.8 |
| Body Weight at the Start of the Test (g) | 1832 | 1631 | 1837 | 1639 |
| Body Weight at the End of the Test (g) | 2977 | 2608 | 3018 | 2680 |
| Feed Consumption (g) | 3630 | 3423 | 3454 | 3250 |
| Body Weight Gain (g) | 1145 | 978 | 1181 | 1040 |
| Rate of Raising (%) | 60.6 | 79.0 | 85.1 | 90.2 |
| Feed Conversion Ratio | 3.17 | 3.50 | 2.93 | 3.12 |
| Production Weight per 3.3 m$^2$ (kg) | 94 | 108 | 130 | 127 |

As shown in Table 4, it was confirmed that the mortalities in Examples 3 and 4 are less half than those in Conventional Examples 2 and 3 and that the increases of body weight in Examples 3 and 4 are about 2.6% more in comparison with those in Conventional Examples 2 and 3.

[Conventional Example 4 and Examples 5 and 6]

Liquid feed for layers:

There were prepared liquid feed compositions shown in Table 5.

TABLE 5

|  | Conventional Example 4 | Example 5 | Example 6 |
|---|---|---|---|
| Glucose | 0 | 5 | 5 |
| Sodium Bicarbonate | 0 | 0 | 0.5 |
| Water | 100 | 95 | 94.5 |
| Total (%) | 100 | 100 | 100 |

Feeding method.

Each of the liquid feeds shown in Table 5 was fed to layers continuously and a commercial feed ("Layer 18H", a product of Ishinomaki Plant, Itochu Feed Mills Co., Ltd. 18% of crude protein content and 2850 kcal of metabolic calorie) was fed ad libitum through the feeding period.

Testing method:

Three hundreds layers of 300 days old were divided into 3 groups of Conventional Example 4, Examples 5 and 6, each consisted of 100 layers. Each group was fed for a month of from Aug. 1, 1994 to Aug. 31, 1994 through that period it was record-breaking fierce heat. The change in egg production and egg weight between before and after the test feeding, and the mortality were compared.

Test results:

The results are shown in Table 6.

TABLE 6

|  | Conventional Example 4 | Example 5 | Example 6 |
|---|---|---|---|
| Average Egg Production (%) | 86.5 → 80.2 | 86.3 → 83.5 | 86.3 → 85.3 |
| Average Egg Weight (g) | 62.8 → 61.7 | 62.5 → 62.3 | 62.4 → 62.5 |
| Monthly Mortality (%) | 0.41 | 0.18 | 0.09 |

In the average egg production and egg weight shown in Table 6, the left numerical values of the arrow indicate value measured for a week immediately before the start of the test while the right ones of the arrow indicate value measured through the test period.

As shown in Table 6, it was confirmed that the reduction of the average egg production in Examples 5 and 6 is less half than that in Conventional Example 4 and that the mortality in Examples 5 and 6 is significantly decreased in comparison with one in Conventional Example 4.

[Conventional Example 5 and Example 7]

Liquid feed for breeders:

There were prepared liquid feed compositions shown in Table 7.

TABLE 7

|  | Conventional Example 5 | Example 7 |
|---|---|---|
| Glucose | 0 | 5 |
| Sodium Bicarbonate | 0 | 0.5 |
| Water | 100 | 94.5 |
| Total (%) | 100 | 100 |

Feeding method:

Each of the liquid feeds shown in Table 7 was fed to breeders continuously and a commercial feed ("Mother", a product of Nagoya Plant, Itochu Feed Mills Co., Ltd. 16% of crude protein content and 2850 kcal of metabolic calorie) was fed ad libitum through the feeding period.

Testing method:

Eight thousand and two hundreds breeders of 270 days old were divided into 2 groups of Conventional Example 5 and Example 7, each consisted of 4100 breeders. Each group was fed for nine weeks of from Jul. 18, 1996 to Sep. 25, 1996. The change in egg production yield between before and after the test feeding and the mortality were compared.

Test results:

The results are shown in Table 8.

TABLE 8

|  | Conventional Example 5 | Example 7 |
| --- | --- | --- |
| Average Egg Production (%) | 75.1 → 56.2 | 75.3 → 62.7 |
| Rate of Increase | 98.3 → 95.7 | 98.2 → 96.6 |

In the average egg production and the rate of raising shown in Table 8, the left numerical values of the arrow indicate value measured for a week immediately before the start of the test while the right ones of the arrow indicate value measured through the test period.

As shown in Table 8, it was confirmed that the reduction of the average egg production in Example 7 is about two thirds of the reduction in Conventional Example 5 and that the rate of increase in Example 7 is better than the rate in Conventional Example 5.

[Conventional Example 6 and Examples 8 and 9]

Liquid feed for layers:

There were prepared liquid feed compositions shown in Table 9.

TABLE 9

|  | Conventional Example 6 | Example 8 | Example 9 |
| --- | --- | --- | --- |
| Glucose | 0 | 5 | 5 |
| Sodium Bicarbonate | 0 | 0 | 0.5 |
| Water | 100 | 95 | 94.5 |
| Total (%) | 100 | 100 | 100 |

Feeding method:

Each of the liquid feeds shown in Table 9 was fed to layers continuously and a commercial feed ("Layer 18H", a product of Ishinomaki Plant, Itochu Feed Mills Co., Ltd. 18% of crude protein content and 2850 kcal of metabolic calorie) was fed ad libitum through the feeding period.

Testing method:

Three hundreds layers of 390 days old were divided into 3 groups of Conventional Example 6, Examples 8 and 9, each consisted of 100 layers. Each group was fed for a month of from Nov. 1, 1994 to Nov. 30, 1994.

The change in egg production and egg weight between before and after the test feeding and the mortality were compared.

Test results:

The results are shown in Table 10.

TABLE 10

|  | Conventional Example 6 | Example 8 | Example 9 |
| --- | --- | --- | --- |
| Average Egg Production (%) | 83.5 → 82.5 | 83.4 → 82.3 | 83.1 → 82.4 |
| Average Egg Weight (g) | 65.3 → 65.9 | 65.2 → 63.8 | 65.4 → 63.9 |
| Monthly Mortality (%) | 0.11 | 0.09 | 0.10 |

In the average egg production and egg weight shown in Table 10, the left numerical values of the arrow indicate value measured for a week immediately before the start of the test while the right ones of the arrow indicate value measured through the test period.

As shown in Table 10, it was confirmed that the average egg production in Examples 8 and 9 is almost same as that in Conventional Example 6 while the average egg weight after the test period in Examples 8 and 9 is decreased in comparison with that before the test in Examples 8 and 9, which is contrary to the result obtained in Conventional Example 6.

We claim:

1. A method for feeding chicken which comprises feeding to chicken which are about 400 days or older after hatching at a temperature of about 25° C. or lower a liquid feed which contains 1~10% by weight of monosaccharide, said liquid feed being the form of an aqueous solution.

2. The method of claim 1 wherein the liquid feed further contains 0.1~1.0% by weight of sodium bicarbonate.

3. A method for feeding chicken which comprises feeding to chicken in the summer season a liquid feed which contains 1~10% by weight of monosaccharide.

4. The method of claim 3 wherein the liquid feed further contains 0.1~1.0% by weight of sodium bicarbonate.

* * * * *